(12) United States Patent
Goel

(10) Patent No.: US 7,805,315 B2
(45) Date of Patent: Sep. 28, 2010

(54) SUBSCRIPTION MANAGEMENT

(75) Inventor: Anil Kumar Goel, Bellevue, WA (US)

(73) Assignee: RealNetworks, Inc., Seattle, WA (US)

( * ) Notice: Subject to any disclaimer, the term of this patent is extended or adjusted under 35 U.S.C. 154(b) by 1394 days.

(21) Appl. No.: 10/630,372

(22) Filed: Jul. 30, 2003

(65) Prior Publication Data

US 2005/0027545 A1    Feb. 3, 2005

(51) Int. Cl.
*G06Q 10/00* (2006.01)
(52) U.S. Cl. .................. 705/1.1; 380/270; 455/3.03
(58) Field of Classification Search ............... 705/1, 705/1.1
See application file for complete search history.

(56) References Cited

U.S. PATENT DOCUMENTS

| 6,574,465 B2 * | 6/2003 | Marsh et al. ............... 455/406 |
| 7,206,765 B2 * | 4/2007 | Gilliam et al. ............... 705/51 |
| 2002/0065037 A1 * | 5/2002 | Messina et al. ............ 455/12.1 |

* cited by examiner

*Primary Examiner*—Janice A. Mooneyham
*Assistant Examiner*—Heidi Riviere
(74) *Attorney, Agent, or Firm*—Kory D. Christensen; Stoel Rives LLP

(57) ABSTRACT

A process, method, and system includes determining if a user has access to a data source. In response to the user being denied access to the data source, a determination is made concerning which upgrade packages would allow the user to access the particular data source.

28 Claims, 6 Drawing Sheets

| Package: | Includes: | Regular Cost: | Discount Cost: |
|---|---|---|---|
| Ultimate Access Package | DS001-030 | $19.95 / month | $18.00 / month |
| Sports Lovers Package | DS015-019 | $4.95 / month | $3.00 / month |
| News Lovers Package | DS006, DS017 | $2.95 / month | $2.95 / month |
| Data Source DS017 | DS017 | $1.95 / month | $1.95 / month |

Fig. 6

SUBSCRIPTION MANAGEMENT

BACKGROUND

Online data sources (e.g., audio streams, video streams, a/v streams, data services, message feeds, and web sites, for example) are becoming increasingly popular. Typically, a user is required to pay a subscription fee (e.g., one-time fees, monthly fees, and annual fees, for example) to access these data sources. Often, subscription packages are offered to users that bundle various data sources together, providing the user with access to multiple data sources while paying only one access fee.

Unfortunately, as the number of subscriptions that a user subscribes to increases, subscription management becomes increasingly cumbersome, in that a user might subscribe to a complete higher-priced package instead of a lower-priced upgrade package. This in turn may result in subscription redundancy and, ultimately, the consumer overpaying.

SUMMARY OF THE INVENTION

In one general aspect, a method includes determining if a user has access to a data source. In response to the user being denied access to the data source, upgrade packages that would allow the user to access the data source are identified.

Implementations may include one or more of the following features. A datastore may be maintained that defines the authorizations possessed by the user, and access to the particular data source may be granted if a user processes a specific authorization.

A datastore record may be accessed to obtain a list of authorizations possessed by the user. The list of authorizations possessed by the user may be compared to the specific authorization required to access the data source. The user may be denied access to the data source if the list of authorizations possessed by the user does not include the specific authorization required to access the data source.

A datastore that defines a plurality of data source packages may be maintained, such that each data source package includes one or more authorizations for data sources. A plurality of data source packages may be examined to determine which include the specific authorization required to access the data source, thus generating a list of upgrade packages. The list of upgrade packages may include one or more discrete data source packages, and/or one or more premium data source packages.

An upgrade cost may be determined for each of the upgrade packages. The list of upgrade packages may be sorted based on the upgrade cost associated with each of the upgrade package, a profit margin associated with each of the upgrade packages, and/or a predetermined marketing preference. An upgrade package may require one or more prerequisite data source packages.

An undiscounted cost may be determined for an upgrade package. This undiscounted cost may be discounted based on a value associated with a list of authorizations possessed by the user, discounted based on a promotional discount, and/or increased based on a cost associated with one or more prerequisite data source packages.

The above-described processes may also be implemented as a sequence of instructions executed by a processor.

The invention can provide one or more of the following advantages. The subscriptions of a user can be automated and more easily managed. Further, by monitoring the total subscription of a user, the user can save money by not purchasing redundant subscriptions. Additionally, the upgrade packages available to a user can be presented in a fashion that steers the user towards a profitable package.

DESCRIPTION OF DRAWINGS

FIG. 6 is a block diagram of an upgrade package list generated by the subscription manager of FIG. 1.

DETAILED DESCRIPTION

Figure 1:
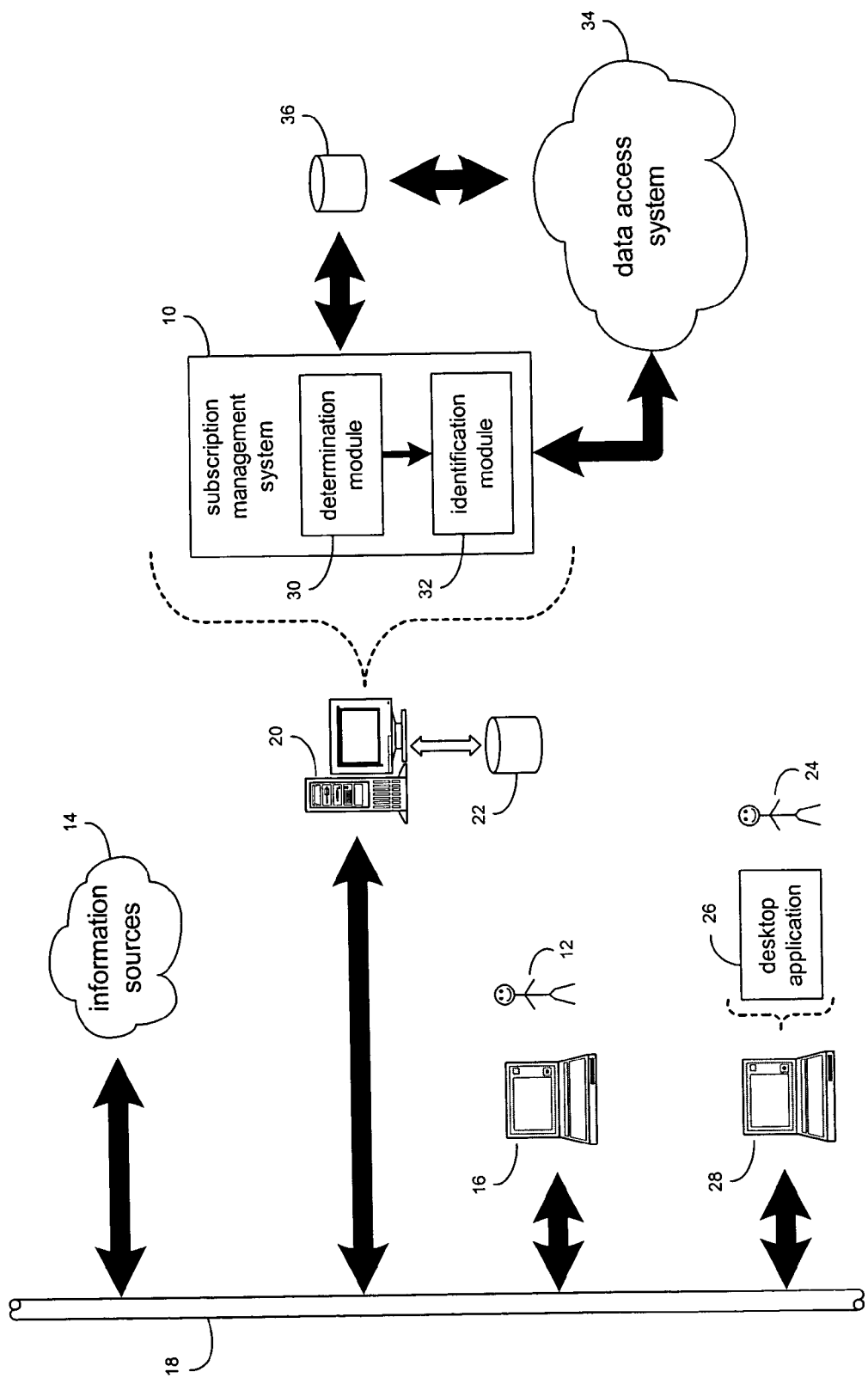
FIG. 1 is a block diagram of a subscription manager.

Referring to FIG. 1, there is shown a subscription manager 10 that manages subscriptions for a user 12 who subscribes to various data sources 14, such as audio streams, video streams, a/v streams, data services, message feeds, and web sites, for example. User 12 typically subscribes to and accesses the data sources through a computer 16 connected to a network 18 (e.g., the Internet, an intranet, a local area network, or some other form of network).

Subscription manager 10 typically resides on and is executed by a computer 20 that is also connected to network 18. The instruction sets and subroutines of subscription manager 10 are typically stored on a storage device 22 connected to computer 20. Storage device 22 may be, for example, a hard disk drive, a tape drive, an optical drive, a RAID array, a random access memory (RAM), or a read-only memory (ROM).

An administrator 24 typically accesses and administers subscription manager 10 through a desktop application 26 (e.g., Microsoft Internet Explorer™, Netscape Navigator™, or a specialized interface) running on a computer 28 that is also connected to the network 18.

Subscription manager 10 typically includes two modules, a determination module 30 and an identification module 32. Whenever a user 12 attempts to access a particular data source, determination module 30 determines if the user 12 has access to that data source. If the user is denied access to the data source, identification module 32 identifies one or more upgrade packages, each of which would allow the user 12 to access the data source that the user is attempting to access. The operation of each of these modules 30 and 32 will be discussed below in greater detail.

The access that user 12 has to each data source 14 is typically controlled by a data access system 34. Accordingly, whenever user 12 attempts to connect to a data source, data access system 34 accesses datastore 36 to determine if the user has the appropriate authorization rights (i.e., authorizations) required for that particular data source. Datastore 36 may be maintained solely by subscription management system 10, solely by data access system 34, or jointly by systems 10 and 34. Typical examples of datastore 36 may be a database, a file system, an LDAP (i.e., Lightweight Directory Access Protocol) server, an applet (e.g., a cookie), a content management system, a standard memory system, and a cached memory system.

Figure 2:
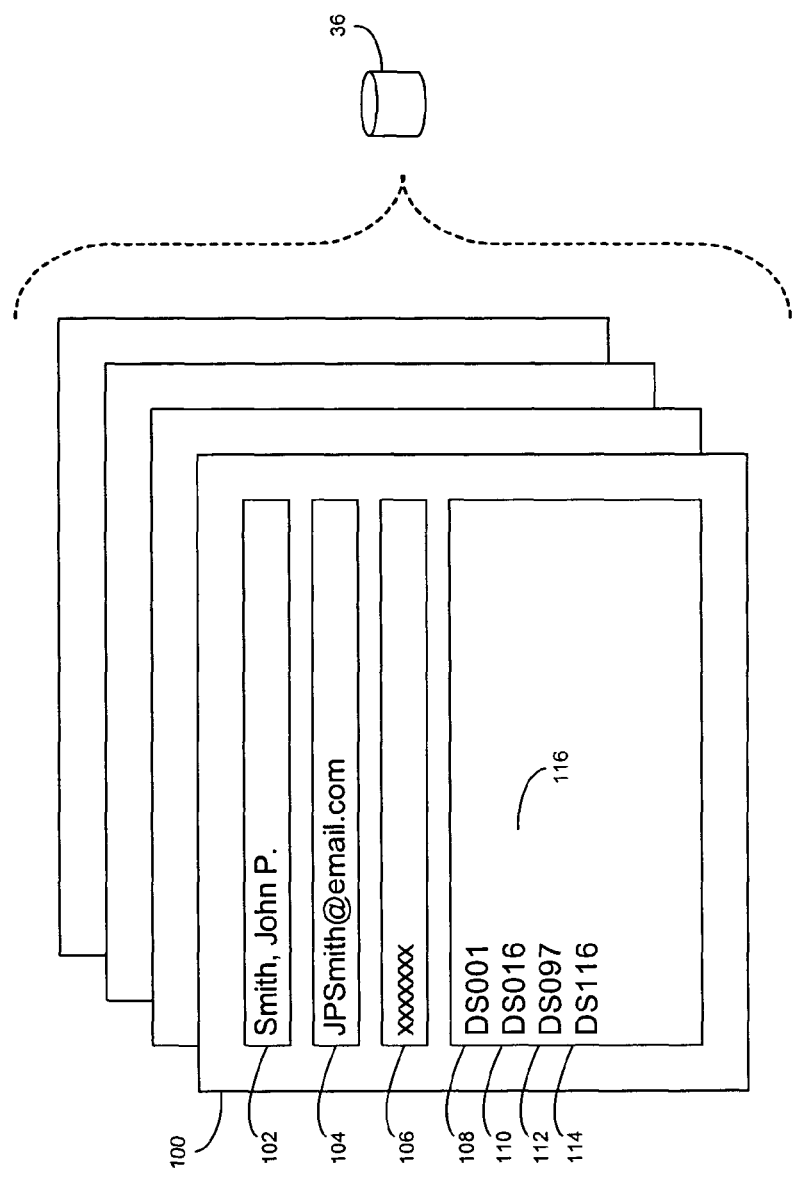
FIG. 2 is a block diagram of a user datastore record.

Referring also to FIG. 2, a datastore record 100 is typically maintained for each user, such that the datastore record includes pertinent identification information, such as name 102, user identifier 104 (e.g., an email address), a password 106, and a list of authorizations 108, 110, 112, and 114, such that each authorization corresponds to a data source that user 12 subscribes to. Accordingly, if datastore record 100 concerns user 12, and user 12 is attempting to access data source DS017, as datastore record 100 does not include a DS017 authorization, user 12 is denied access to data source DS017.

Figure 3:
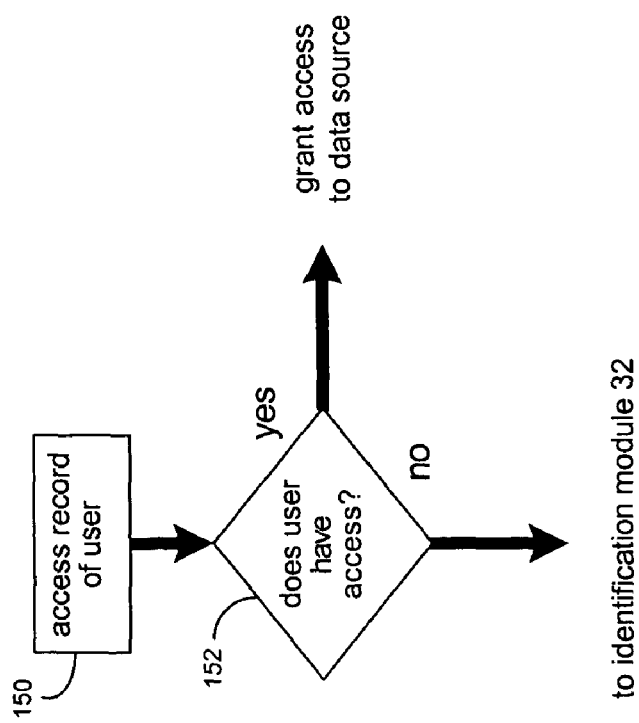
FIG. 3 is a block diagram of a determination module of the subscription manager of FIG. 1.

Referring also to FIG. 3, whenever a user attempts to access a data source, determination module 30 accesses 150 the user datastore record for the particular user who is attempting to access the data source. From this user datastore record, a list of authorizations 116 is retrieved that defines the data source(s) to which the user has access.

Continuing with the above-stated example, if datastore record 100 concerns user 12, user 12 has access to data sources DS001, DS016, DS097, and DS116. If user 12 is currently attempting to access data source DS017, determination module 30 compares 152 the list of authorizations 116 specified in the datastore record 100 to the authorization required to access the data source to determine if the user has access to the data source. If the list of authorizations 116 includes the specific authorization required to access the data source, user 12 is granted access to the data source.

However, since the list of authorizations 116 in datastore record 100 does not include authorization DS017, user 12 is denied access to data source DS017. In response to user 12 being denied access to the data source, identification module 32 identifies upgrade packages that (if subscribed to) would allow user 12 to access data source DS017.

In addition to datastore 36 containing user datastore records, datastore 36 also contains records that define various data source packages. These packages, when purchased by a user, provide the user with authorizations that grant the user access to various data sources. Upon purchasing a data source package, the datastore record of the user is modified to add any additional authorizations purchased. Conversely, upon canceling a data source package, the datastore record of the user is modified to remove any authorizations for data sources that the user no longer subscribes to.

Concerning the data source packages, these packages may be discrete packages that include only an authorization for a single data source. Alternatively, a data source package may include authorizations for a large number of data sources.

Figure 4:
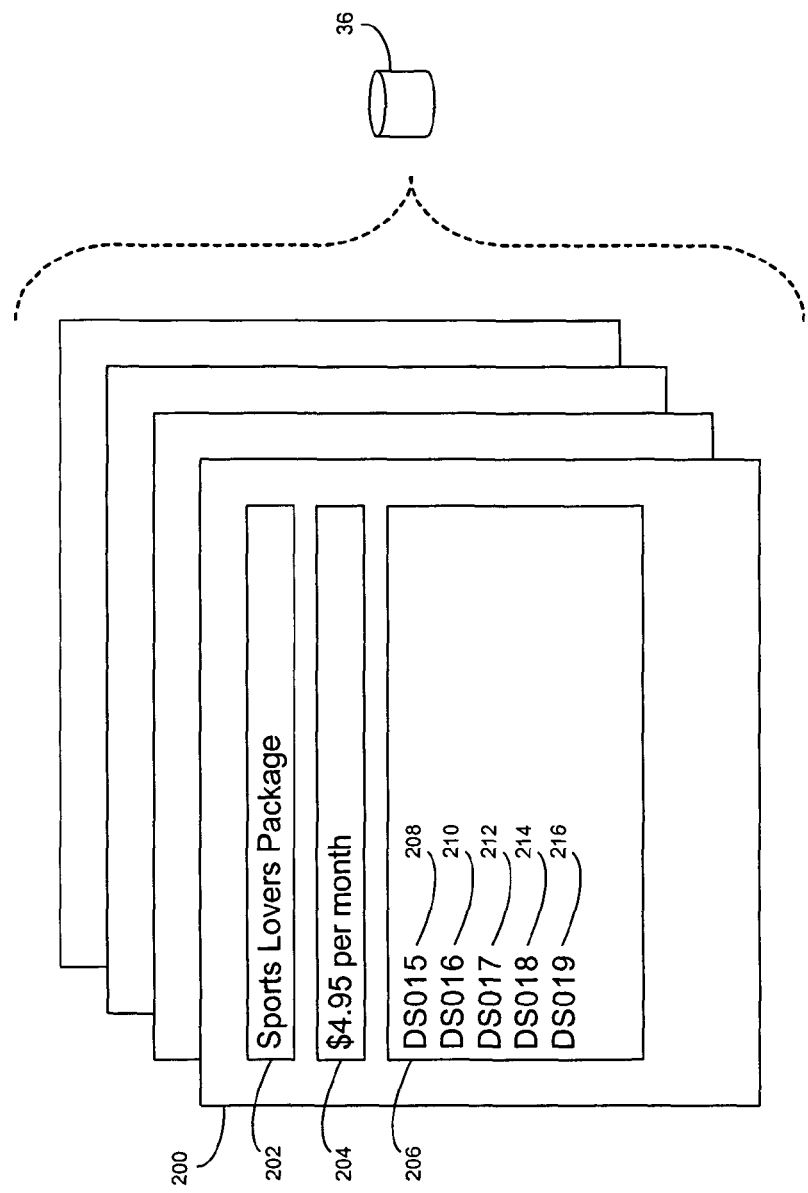
FIG. 4 is a block diagram of an identification module of the subscription manager of FIG. 1.

Referring to FIG. 4, a package datastore record 200 is shown, which includes pertinent information concerning the data source package, such as the package name 202, the package cost 204, and a list of authorizations 206 that define the discrete authorizations 208, 210, 212, 214, and 216 included in the package.

Figure 5:
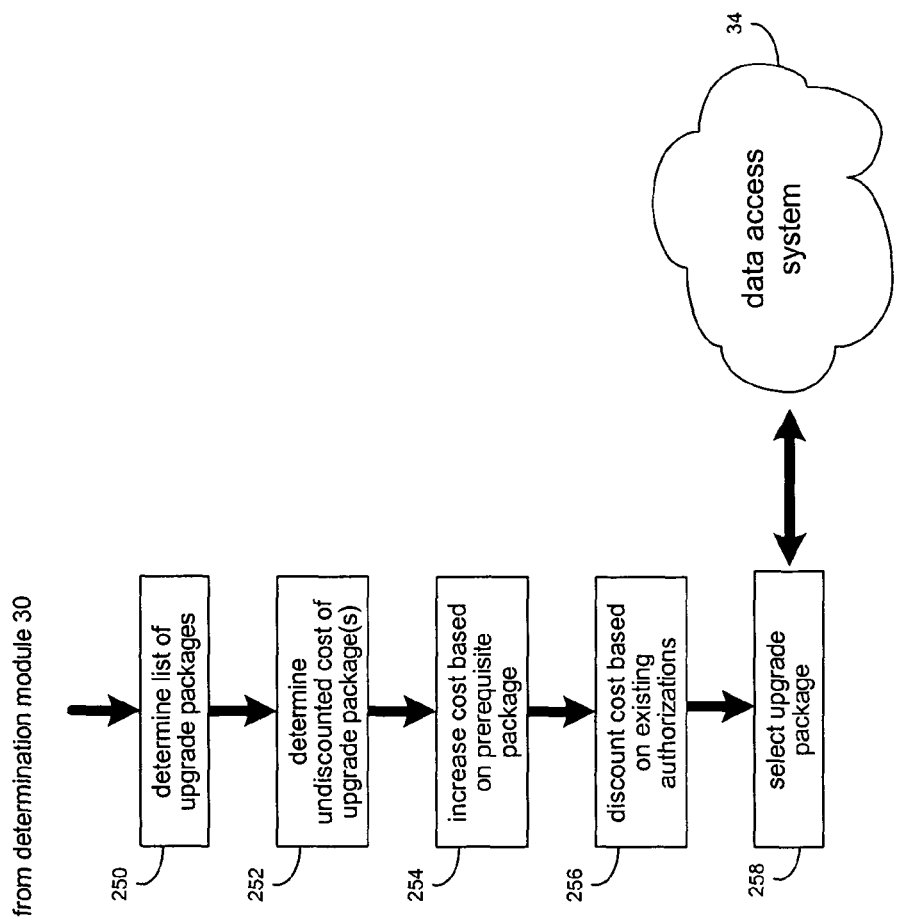
FIG. 5 is a block diagram of an identification module of the subscription manager of FIG. 1.

Referring to FIGS. 1 and 5 and continuing with the above-stated example, once it is determined that user 12 is not authorized to access data source DS017, identification module 32 determines 250 which data source packages would allow user 12 to access data source DS017, resulting in the generation of an upgrade package list. This determination is made by querying the package datastore records (e.g., record 200) stored within datastore 36 to determine which data source packages allow access to the data source that the user is attempting to access.

Referring also to FIG. 6, an example of an upgrade package list 300 is shown. Upgrade list 300 is typically a multi-column table that defines the individual upgrade packages 302, 304, 306, and 308 that will allow the user to access the data source they are attempting to access.

Upgrade package list 300 provides information concerning each upgrade package, such as the package name 310, the package description 312, the undiscounted package cost 314, and the discounted package cost 316, for example. List 300 is typically presented to user 12 as a web page viewable on computer 16.

When identification module 32 generates upgrade package list 300, the list may be sorted based on various criteria, such as upgrade cost (as shown), regular cost, or alphabetically based on package name. The user may be able to define the sorting criteria or it may be fixed by the administrator 24.

Further, the administrator 24 of the subscription manager 10 may choose to sort the upgrade packages based on the profit margin associated with each upgrade package, or a marketing preference. For example, if the ultimate access package 302 has a profit margin of $4.00, and this profit margin is greater than the profit margin associated with any of the other upgrade packages 304, 306, and 308 included in list 300, the ultimate access package may be positioned at the top of list 300. Additionally, any special or promotional packages may be positioned at the top of list 300.

Identification module 32 determines an upgrade cost for each upgrade package in accordance with various pricing criteria, such as the authorization(s) currently possessed by the user, the cost of any mandatory prerequisite packages, and any promotional discounts, for example. In order to determine an upgrade cost of an upgrade package, identification module 32 determines 252 the undiscounted cost of each upgrade package included in list 300. This undiscounted cost is generally the full price of the package.

Additionally, identification module 32 may determine if any of the upgrade packages have prerequisite data source packages. A prerequisite data source package is a second data source package that a user must be subscribed to in order to subscribe to a first data source package. If such a prerequisite data source package exists, identification module 32 increases 254 the undiscounted cost of the upgrade package based on the value of any prerequisite data source package(s) required for the upgrade package.

For example, if ultimate access package 302 requires that the user 12 also be subscribed to a preferred access package, the preferred access package is a prerequisite data source package with respect to ultimate access package 302. Further, if the preferred access package has a subscription fee of $9.95 per month, this additional cost is added to the cost of the ultimate access package 302. Therefore, if identification module 32 determines that the preferred access package is a prerequisite data source package for the ultimate access package 302, the undiscounted package cost 314 of the ultimate access package 302 would be increased 254 from $19.95/month to $29.90/month (i.e., $9.95, the cost of the preferred access package).

When determining the upgrade cost of each package, identification module 32 may also discount 256 the undiscounted cost (with or without adjustment for prerequisite packages) based on the value associated with the authorizations already possessed by the user 12.

Continuing with the above-stated example, prior to attempting to access data source DS017, user 12 already had access (i.e., possessed an authorization) to data source DS016, in addition to DS001, DS097, and DS116. As shown in upgrade package list 300, the cost of accessing data source DS017 as a stand-alone data source is $1.95 per month. And the news lovers package 306, which includes access to data sources DS006 and DS017, is $2.95/month. Since both the ultimate access package 302 and the sports lovers package 304 each include access to data source DS016, and user 12 already has access to data source DS016, the cost of each of these packages is discounted based on this existing subscription.

Assuming that user 12 is paying $1.95/month to access data source DS016, user 12 will no longer have to subscribe to this discrete data source, as it is bundled into either one of packages 302 and 304. Accordingly, the cost of each of these packages can be discounted by $1.95/month to $18.00/month and $3.00/month respectively.

From list 300, user 12 can select 258 which (if any) upgrade packages the user wishes to subscribe to. This selection information is typically provided to data access system 34, which handles the processing and billing of the subscription fees and modifies the user datastore record 100 (See FIG. 2) to reflect the new authorizations possessed by the user.

While the system is described above as identifying one or more upgrade packages in response to a user being denied access to a data source, other configurations are possible. For example, the user may be presented with a list of upgrade packages even if the user never tries to access the data source for which they do not have access. If, for example, a user fills out an online questionnaire that shows that the user is interested in sports, that user may be presented with a list of upgrades that would allow that user to access multiple data sources related to sports (e.g., the sports lovers package). Further, if the user spends a considerable amount of time browsing sports related websites, that user may again be presented with a list of upgrade packages that would allow that user to access multiple data sources related to sports.

While the system is described above as allowing a user to access data sources through a computer, other configurations are possible. For example, the user may access the data sources through cellular telephones, personal digital assistants, and Internet radios.

While the system is described above as being based on United States currency, the system may be configured to work with any other currency.

While the system is described above as offering upgrade packages in monthly increments, other configurations are possible, such as annual increments and one-time payment lifetime plans.

While the system is described above as offering four upgrade packages to the user, other configurations are possible. For example, the maximum number of upgrade packages offered to a user may be restricted by the administrator or the user of the system.

While the system is described above as being applicable with online data source subscriptions, other configurations are possible. For example, the system may be configured to be compatible with other subscriptions that are sold in packages, such as magazine subscriptions and cable subscriptions.

The system and method described herein is not limited to the implementation described above; it may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method may also be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

Additionally, implementations of the system and method described above need not be performed by a computer and/or computing device and may be performed manually using standard arithmetic processes and procedures.

A number of implementations have been described. Nevertheless, it will be understood that various modifications may be made. Accordingly, other implementations are within the scope of the following claims.

What is claimed is:

1. A computer implemented method for managing a plurality of subscription packages to online audio stream sources accessible through the internet to reduce or avoid redundant online subscriptions paid for by a user, the method comprising:

electronically receiving, at a processor, information indicative of a request by the user for access to a first online audio stream source accessible through the internet;

determining, using the processor, that the user is denied access to the first online audio stream source, wherein the determination that the user is denied access is based on a comparison of the first online audio stream source to each current online subscription package associated with the user, and wherein the comparison indicates that the first online audio stream source is not included in any of the current online subscription packages associated with the user;

in response to the determination that the user is denied access to the first online audio stream source based on the user's current online subscription packages, identifying, using the processor, one or more a plurality of upgrade packages that would allow the user to access the first online audio stream source; determining, using the processor, an undiscounted upgrade cost associated with each of the identified upgrade packages;

determining, using the processor, that at least one of the identified upgrade packages requires a prerequisite online audio stream source package;

increasing, using the processor, the undiscounted upgrade cost of each identified upgrade package that requires the prerequisite online audio stream source package;

determining, using the processor, wherein for each identified upgrade package the determination of the upgrade cost is based at least in part upon a value associated with a list of required authorizations already possessed by the user, for access to one or more second online audio stream sources included in the identified upgrade packages and the prerequisite online audio stream package;

discounting, using the processor, wherein the upgrade cost associated with each of the identified upgrade packages based on the required authorizations already possessed by the user;

receiving, at the processor, a user selection of one of the identified upgrade packages; and in response to the user selection, charging the user the discounted cost of the selected upgrade package.

2. The method of claim 1, further comprising:
maintaining a datastore that defines the authorizations possessed by one or more users.

3. The method of claim 1, wherein access to the first online audio stream source is granted if a user possesses a specific authorization.

4. The method of claim 2, further comprising determining if a user has access to an online audio stream source, wherein the determination includes:
accessing a datastore record to obtain a list of authorizations possessed by the user.

5. The method of claim 4, wherein determining if a user has access further includes:
comparing the list of authorizations possessed by the user to the specific authorization required to access the online audio stream source;
wherein the user is denied access to the online audio stream source if the list of authorizations possessed by the user does not include the specific authorization required to access the online audio stream source.

6. The method of claim 1, further comprising:
maintaining a datastore that defines a plurality of online audio stream source packages, wherein each online audio stream source package includes one or more authorizations for online audio stream sources.

7. The method of claim 1, wherein identifying one or more upgrade packages includes: determining which of the plurality of online audio stream source packages includes a specific authorization required to access the first online audio stream source, thus generating a list of upgrade packages.

8. The method of claim 7, wherein the list of upgrade packages includes one or more discrete online audio stream source packages.

9. The method of claim 7, wherein the list of upgrade packages includes one or more premium online audio stream source packages.

10. The method of claim 7, wherein identifying one or more upgrade packages includes:
sorting the list of upgrade packages based on the upgrade cost associated with each of the upgrade packages.

11. The method of claim 7, wherein identifying one or more upgrade packages includes:
sorting the list of upgrade packages based on a profit margin associated with each of the upgrade packages.

12. The method of claim 7, wherein identifying one or more upgrade packages includes: sorting the list of upgrade packages based on a predetermined marketing preference.

13. The method of claim 7, wherein determining an upgrade cost associated with each of the identified upgrade packages includes: determining an undiscounted cost for the upgrade package; and discounting the undiscounted cost based on a value associated with the required authorizations already possessed by the user.

14. The method of claim 7, wherein determining an upgrade cost associated with each of identified upgrade packages includes: determining an undiscounted cost for the upgrade package; and discounting the undiscounted cost based on a promotional discount.

15. A computer program product residing on a non-transitory computer readable medium having a plurality of instructions stored thereon which, when executed by the processor, cause that processor to:
electronically receive information indicative of a request by a user for access to a first online audio stream source accessible through the internet;
determine that the user is denied access to the first online audio source, wherein the determination that the user is denied access is based on a comparison of the first online audio stream source to each current online subscription package associated with the user, and wherein the comparison indicates that the first online audio stream source is not included in any of the current online subscription packages associated with the user;
in response to the determination that the user is denied access to the first online audio stream source based on the user's current online subscription packages, identify a plurality of upgrade packages that would allow the user to access the first online audio stream source;
determine an undiscounted upgrade cost associated with each of the identified upgrade packages;
determine that at least one of the identified upgrade packages requires a prerequisite online audio stream source package;
increase the undiscounted upgrade cost of each identified upgrade package that requires the prerequisite online audio stream source package;
determine a list of required authorizations already possessed by the user for access to one or more second online audio stream sources included in the identified upgrade package and the prerequisite online audio stream package;
discount the upgrade cost associated with each of the identified upgrade packages based on the required authorizations already possessed by the user;
receive a user selection of one of the identified upgrade packages; and
in response to the user selection, charge the user the discounted cost of the selected upgrade package.

16. The computer program product of claim 15, further comprising instructions for:
maintaining a datastore that defines the authorizations possessed by one or more users.

17. The computer program product of claim 15, wherein access to the first online audio stream source is granted if a user possesses a specific authorization.

18. The computer program product of claim 16, wherein the instructions further include determining if the user has access to the one or more second online audio stream source, wherein the instructions for determining if a user has access further include instructions for: accessing the datastore record to obtain a list of authorizations possessed by the user.

19. The computer program product of claim 18, wherein the instructions for determining if a user has access further include instructions for:
comparing the list of authorizations possessed by the user to the specific authorization required to access the online audio stream source;
wherein the user is denied access to the online audio stream source if the list of authorizations possessed by the user does not include the specific authorization required to access the online audio stream source.

20. The computer program product of claim 15, further comprising instructions for:
   maintaining a datastore that defines a plurality of online audio stream source packages, wherein each online audio stream source package includes one or more authorizations for online audio stream sources.

21. The computer program product of claim 15, wherein the instructions for identifying one or more upgrade packages include instructions for:
   determining which of a plurality of online audio stream source packages includes a specific authorization required to access the first online audio stream source, thus generating a list of upgrade packages.

22. The computer program product of claim 21, wherein the list of upgrade packages includes one or more discrete online audio stream source packages.

23. The computer program product of claim 21, wherein the list of upgrade packages includes one or more premium online audio stream source packages.

24. The computer program product of claim 21, wherein the instructions for identifying one or more upgrade packages include instructions for:
   sorting the list of upgrade packages based on the upgrade cost associated with each of the upgrade package.

25. The computer program product of claim 21, wherein the instructions for identifying one or more upgrade packages include instructions for:
   sorting the list of upgrade packages based on a profit margin associated with each of the upgrades.

26. The computer program product of claim 21, wherein the instructions for identifying one or more upgrade packages include instructions for:
   sorting the list of upgrade packages based on an predetermined marketing preference.

27. The computer program product of claim 21, wherein the instructions for determining an upgrade cost associated with each of the identified upgrade packages include instructions for: determining an undiscounted cost for an upgrade package; and discounting the undiscounted cost based on a value associated with the required authorizations already possessed by the user.

28. The computer program product of claim 21, wherein the instructions for determining an upgrade cost associated with each of the identified upgrade packages include instructions for: determining an undiscounted cost for an upgrade package; and discounting the undiscounted cost based on a promotional discount.

* * * * *